Patented June 8, 1948

2,442,957

UNITED STATES PATENT OFFICE 2,442,957

ETHYLENE SULFIDE REACTION PRODUCTS OF GUANYLUREA

Leonard P. Moore, New York, N. Y., and Walter P. Ericks, Stamford, Conn., assignors to American Cyanamid Company, New York, N. Y., a corporation of Maine No Drawing. Application September 19, 1942, Serial No. 459,002

1 Claim. (Cl. 260—553)

This invention relates to the preparation of new guanylurea derivatives. More particularly it embraces the reaction of ethylene sulfide with guanylurea. It relates especially to the preparation of mercapto-alkyl guanylureas. This case is a continuation-in-part of Serial No. 370,146, filed December 14, 1940, by Leonard P. Moore and Walter P. Ericks, now Patent 2,323,409.

It is an object of this invention to prepare compounds by simple and efficient processes. A further object is to obtain them in a conveniently utilizable form. Other and further objects as well as uses for the compounds herein prepared will be found in the following description.

The objects of this invention are attained by reacting ethylene sulfide with guanylurea.

The new preparations find a very wide range of uses. For example, they can be applied to leather as dehairing agents. They are useful also as intermediates in the preparation of resins, some forming resinous polymerization products by simply heating the product. Still others are highly effective and cheap insecticides. Still other uses are found in the compounding of rubber and rubber containing articles where the products of this invention are found to exert favorable plasticizing and some vulcanization accelerating activity.

In order to facilitate a further understanding of the invention, the following examples are given primarily for the purpose of illustrating certain more specific details thereof. The scope of the invention is not to be deemed limited thereby except as defined in the claim.

Example 9.1 g. of guanylurea in the form of the sulfate (0.027 mol.) was dissolved in 40 cc. of water by warming. 1.12 g. of sodium hydroxide was added with stirring until dissolved whereafter 150 cc. of denatured ethyl alcohol was added with stirring to precipitate the sodium sulfate. The reaction was allowed to proceed for 30 minutes while being cooled in an ice bath. This solution was filtered, and the filtrate evaporated under vacuum on a steam bath until it weighed 17.6 g. 6 g. of ethylene sulfide was added to this aqueous solution and the mixture heated on a steam bath until refluxing ceased. Filtering the solution, washing the precipitate three times with water and drying yielded 6.2 g. of the desired product 2-mercaptoethyl guanylurea.

It is to be understood that scope of this invention is not to be limited by the examples specifically contained herein illustrating specific embodiments of the invention since many modifications and various combining weights of the reacting ingredients may be used, but that it is to be construed broadly and restricted solely by the scope of the appended claim.

We claim:

A condensation product of ethylene sulfide and guanylurea.

WALTER P. ERICKS.
LEONARD P. MOORE.

REFERENCES CITED

The following references are of record in the file of this patent:

UNITED STATES PATENTS

| Number | Name | Date |
|---|---|---|
| 1,785,916 | Schotte | Dec. 23, 1930 |
| 2,121,337 | Brodersen et al. | June 21, 1938 |
| 2,136,928 | Schlack | Nov. 15, 1938 |
| 2,265,942 | Hill | Dec. 9, 1941 |

OTHER REFERENCES

Cheronis, "Org. Chemistry" (1941), pages 200–201, 492.